United States Patent [19]   [11]   4,314,866
Webber   [45]   Feb. 9, 1982

[54] METHOD FOR ELEVATED-TEMPERATURE BONDING OF MATERIAL WITH DIFFERENT COEFFICIENTS OF THERMAL EXPANSION

[75] Inventor: Robert C. Webber, Marietta, Ga.

[73] Assignee: Lockheed Corporation, Burbank, Calif.

[21] Appl. No.: 214,477

[22] Filed: Dec. 9, 1980

[51] Int. Cl.³ .............................................. B32B 7/12
[52] U.S. Cl. .................................. 156/163; 156/285; 156/307.3; 156/311
[58] Field of Search ................. 156/64, 163, 286, 285, 156/307.3, 307.1, 311, 83, 160, 306.9; 264/229, 230; 269/172; 428/212; 29/464, 468

[56] References Cited

U.S. PATENT DOCUMENTS 2,401,987 6/1946 Taylor et al. ....................... 156/311
3,879,251 4/1975 Ingham ................................ 156/311
4,220,491 9/1980 Metcail et al. ..................... 156/285
4,223,429 9/1980 Robinson ............................ 156/91

FOREIGN PATENT DOCUMENTS 1011188 5/1977 Canada ............................... 156/286

Primary Examiner—Michael W. Ball
Assistant Examiner—F. K. Wine
Attorney, Agent, or Firm—A. L. Carter

[57] ABSTRACT

A method to eliminate stresses and consequent warping in elevated-temperature cured adhesive bonded parts with different coefficients of thermal expansion.

8 Claims, 4 Drawing Figures

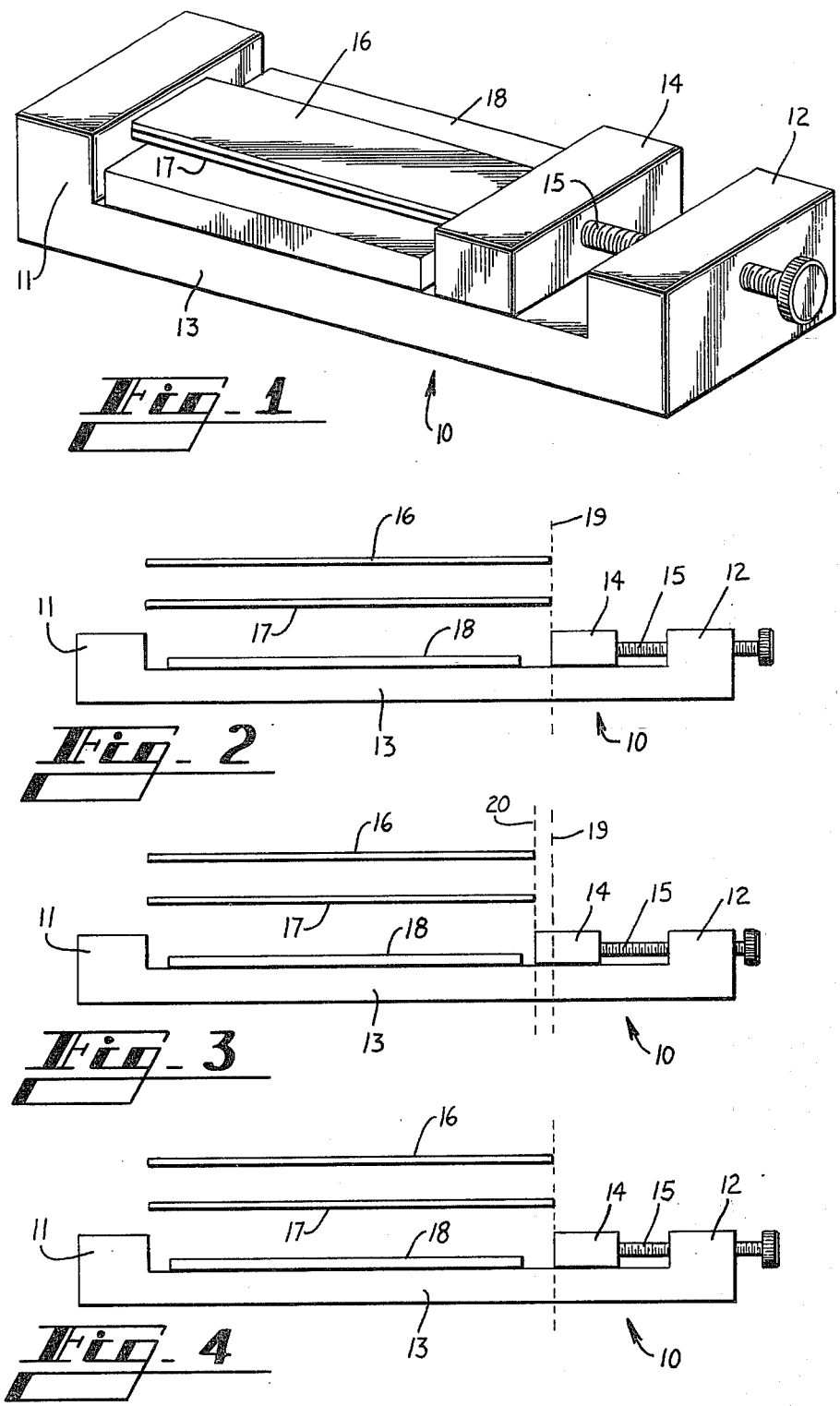

METHOD FOR ELEVATED-TEMPERATURE BONDING OF MATERIAL WITH DIFFERENT COEFFICIENTS OF THERMAL EXPANSION

TECHNICAL FIELD

This invention relates to a method of adhesive bonding of adherends having different coefficients of thermal expansion, and more particularly to instances where elevated temperatures are used to cure the adhesive used to join the adherends.

BACKGROUND ART

When two materials having different coefficients of thermal expansion (such as different metals or a metal and a non-metal) are adhesively bonded at an elevated temperature for adhesive cure, the adherends being bonded together tend to move in relation to each other during cooling to room temperature due to the differential contraction during cool down. This relative movement between the adherends during cool down tends to cause warping in some bonded assemblies; the degree of such warping being dependent upon the geometry of the adherends, the geometry of the bond line, and the difference between the adhesive cure and ambient temperatures.

DISCLOSURE OF THE INVENTION

The method of this invention is to pre-compress the adherends with uncured adhesive between them in tooling prior to the heating of the tooling and adherends therein to cure the adhesive. The amount of pre-compression is calculated so that when the tool and adherends are heated to the adhesive curing temperature, the adherends as held by the tool are at the same size as they would be at room temperature in the uncompressed state. Since the adherends are at their room temperature size when the adhesive cures (hardens), there is little, if any, tendency for the adherends to move in relation to each other when they are cooled to room temperature and removed from the tooling. Consequently, warpage resulting from the difference in coefficients of thermal expansion between the adherends is substantially reduced, if not eliminated.

BRIEF DESCRIPTION OF THE DRAWINGS

FIG. 1 is a perspective view of a pair of elongated adherends of different materials located in a clamping tool in preparation for practice of this invention.

FIGS. 2, 3 and 4 depict diagrammatically one example of relative dimensional relationships between the tool and adherends at various times during the practice of this invention.

DETAILED DESCRIPTION

One embodiment of the practice of this invention is shown in FIG. 1 and involves the use of a clamping device or means 10 having a pair of stationary blocks 11 and 12 interconnected by a base 13 with an adjustable movable block 14 located therebetween. The adjustability or movability of block 14 is controlled by a screw member 15 threadedly engaged through a threaded passage in block 12 and pivotally engaged with block 14. Adherends 16 and 17 of substantially equal length and having an uncured, thermal curing adhesive therebetween are located between blocks 11 and 14 on a base plate member 18; the spacing between blocks 11 and 14 being greater than the length of the adherends 16 and 17. After adherends 16 and 17 are so located, block 14 is moved toward block 11 until the distance separating blocks 11 and 14 is equal to the length of adherends 16 and 17. At this point, the block 14 is further closed toward block 11 so as to compress the adherends 16 and 17 longitudinally; the amount of compression of adherends 16 and 17 being equal to the expansion of the spacing between blocks 11 and 14 resulting from the coefficient of thermal expansion of the clamping means 10 material as the temperature thereof is raised from room temperature to the elevated temperature at which the adhesive cures. In this manner, the longitudinal length of adherends 16 and 17 at the elevated temperature for curing the adhesive and thence at the time of cure thereof, will be at substantially the same longitudinal dimension they will be at when cooled down to room temperature and freed from clamping means 10.

An example of the principle involved in the teaching of this invention will now be presented with reference to FIGS. 2, 3 and 4. A pair of adherends 16 and 17 of different materials (i.e., they have different coefficient of thermal expansion properties) each of twelve inches of longitudinal length at a room temperature of 75° F., and having an uncured heat-curable adhesive (not shown) therebetween are placed on top of base plate member 18 intermediate blocks 11 and 14 of clamp means 10. Block 14 is then moved toward block 11 until the spacing between the confronting surfaces of blocks 11 and 14 at such room temperature is twelve inches as indicated by line 19 running through FIGS. 2, 3 and 4 representing a twelve inch spacing of block 14 from the inner face of fixed block 11. Now assuming for the purpose of this example explanation that the material of clamping means 10 is of a steel having a coefficient of thermal expansion of $8 \times 10^{-6}$ inch/inch/°F., and that the curing temperature of the adhesive used is 250° F., the result would be that upon raising the temperature of clamping means 10 from the room temperature of 75° F. to a curing temperature of 250° F. for the adhesive, the twelve inch dimension at room temperature between confronting surfaces of blocks 11 and 14 will expand approximately 0.0168 inch at the 250° F. temperature. This amount of expansion is derived by the calculation of $(250-75)°F$. temperature increase $\times (8 \times 10^{-6})$ inch/inch/°F. $\times 12$ inches $= 0.0168$ inch.

By compressing the adherends 16 and 17 by the amount of 0.0168 inch at room temperature through movement of block 14 toward block 11 whereby the face of block 14 is located at line 20 in FIG. 3, the dimensional spacing between the confronting faces of blocks 11 and 14 will be $12 - 0.0168 = 11.9832$ inches at the room temperature of 75° F., and which in turn will expand to approximately 12 inches when the clamping means 10 and adherends 16 and 17 are heated to the adhesive curing temperature of 250° F.; thusly, making the length of adherends 16 and 17 at the elevated temperature at time of adhesive cure substantially the same as at room temperature as represented by the spacing between the confronting surfaces of blocks 11 and 14 in FIG. 4.

After the appropriate time at the elevated temperature to complete the adhesive cure, the compression of adherends 16 and 17 can be removed at any time during the cool down period as well as after stabilization at room temperature. Also, it is believed immaterial whether the adherend member having the higher or lower coefficient of thermal expansion is located in the clamping means 10 so as to be the member in contact with base plate 18; or in other words there is no special requirement for the stacking order of the adherend members relative to base plate 18.

In the event the amount of pre-adhesive cure compression causes the adherends to bow or arch between blocks 11 and 14, such can be eliminated by either the containment of the clamping means 10 with the clamped adherends in a conventional known vacuum bag arrangement, the placement of an appropriate weight on top of the adherends intermediate blocks 11 and 14, or the physical clamping of the adherends to base plate member 18.

Should the adherend materials be of a width as well as a length to cause widthwise deformation due to difference in the coefficients of thermal expansion, any appropriate sideways clamping means may be combined with the longitudinal clamping arrangement.

Likewise, should the final bonded assembly call for adherends of relative differing dimensions, the practice of the process of this invention can still be applied by utilizing a workpiece of the final smaller dimensional adherend cut to the size of the final larger dimensioned adherend with the applied intermediate adhesive limited to the confines of the final smaller dimensional adherend, and removing by any appropriate method the excess of the final smaller dimensioned adherend material after adhesive cure.

In view of the above, it can be seen that by practice of the method or process of this invention, the heretofore experienced warping or deformation of thermal cured adhesive bonded members having different coefficients of thermal expansion can be substantially, if not completely, eliminated.

While particular embodiments of this invention have been illustrated and described, it will be obvious to those skilled in the art that various changes and modifications may be made without departing from the invention, and it is intended to cover in the appended claims all such modifications and equivalents that fall within the true spirit and scope of this invention.

What is claimed is:

1. A method for reducing post-adhesive-cured warping or deformation of thermal cured adhesive bonded adherends having different coefficients of thermal expansion comprising the steps of:

(a) stacking the adherends in a clamping means with a thermal curing adhesive in an uncured state between each adjacent pair of adherends;

(b) compressing one pair of opposite side edges of the adherends by closure of the clamping means by an amount substantially equal to the amount of thermal expansion the clamping means will experience between the clamping means members compressing the adherends by the temperature differential between the clamping temperature and the adhesive cure temperature so that the dimension between the opposite side edges of the adherends at the adhesive cure temperature will be substantially the same dimension as at the clamping temperature;

(c) elevating the temperature of the clamping means, the adherends and the adhesive to at least the cure temperature of the adhesive; and (d) after cure of the adhesive, removing the adherends from the clamping means.

2. A method as claimed in claim 1 wherein the step comprising providing planar retention of the adherends in the clamping means to eliminate bowing or arching of the adherends in their compressed state is utilized between steps (b) and (c).

3. A method as claimed in claim 2 wherein the planar retention step includes vacuum bag packaging of the clamping means, adherends and adhesive.

4. A method as claimed in claim 2 wherein the planar retention step includes placement of a weight means planarly on the adherend stack.

5. A method as claimed in claim 2 wherein the planar retention step includes planarly clamping of the adherend stack to the clamping means.

6. A method as claimed in claim 1 wherein the removal of adherends from the clamping means in step (d) occurs during cool down from the adhesive curing temperature and before attainment of ambient room temperature.

7. A method as claimed in claim 1 wherein the removal of adherends from the clamping means in step (d) occurs at ambient room temperature after cool down from the adhesive curing temperature.

8. A method as claimed in claim 1 wherein an additional step (b) is included on a second pair of opposite side edges of the adherends utilizing a second clamping means.

* * * * *